(12) United States Patent
Cohen et al.

(10) Patent No.: US 10,275,020 B2
(45) Date of Patent: Apr. 30, 2019

(54) NATURAL USER INTERFACES FOR MOBILE IMAGE VIEWING

(71) Applicant: MICROSOFT TECHNOLOGY LICENSING, LLC, Redmond, WA (US)

(72) Inventors: Michael F. Cohen, Seattle, WA (US); Neel Suresh Joshi, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 775 days.

(21) Appl. No.: 14/487,240

(22) Filed: Sep. 16, 2014

(65) Prior Publication Data
US 2015/0002393 A1 Jan. 1, 2015

Related U.S. Application Data

(62) Division of application No. 13/159,010, filed on Jun. 13, 2011, now abandoned.

(51) Int. Cl.
G06F 3/048 (2013.01)
G06F 3/01 (2006.01)
G06F 3/0481 (2013.01)

(52) U.S. Cl.
CPC .......... G06F 3/012 (2013.01); G06F 3/04815 (2013.01); G06F 2200/1637 (2013.01)

(58) Field of Classification Search
CPC ...... G06F 3/012; G06F 3/04815; G06F 3/011; G06F 2200/1637
See application file for complete search history.

(56) References Cited

U.S. PATENT DOCUMENTS

| 4,734,685 A  | 3/1988  | Watanabe      |
| 6,466,198 B1 | 10/2002 | Feinstein     |
| 7,301,528 B2 | 11/2007 | Marvit et al. |
| 7,859,553 B2 | 12/2010 | Bae           |
| 7,903,084 B2 | 3/2011  | Marvit et al. |

(Continued)

OTHER PUBLICATIONS

Chiusano, Andrew Tsutomu, Final Office Action, U.S. Appl. No. 13/159,010, dated Feb. 16, 2016, pp. 1-20.

(Continued)

*Primary Examiner* — Andrew T Chiusano
(74) *Attorney, Agent, or Firm* — Alleman Hall Creasman & Tuttle LLP (57) ABSTRACT

The mobile image viewing technique described herein provides a hands-free interface for viewing large imagery (e.g., 360 degree panoramas, parallax image sequences, and long multi-perspective panoramas) on mobile devices. The technique controls the imagery displayed on a display of a mobile device by movement of the mobile device. The technique uses sensors to track the mobile device's orientation and position, and front facing camera to track the user's viewing distance and viewing angle. The technique adjusts the view of a rendered imagery on the mobile device's display according to the tracked data. In one embodiment the technique can employ a sensor fusion methodology that combines viewer tracking using a front facing camera with gyroscope data from the mobile device to produce a robust signal that defines the viewer's 3D position relative to the display.

18 Claims, 6 Drawing Sheets

(56) References Cited

U.S. PATENT DOCUMENTS

| | | | |
|---|---|---|---|
| 8,581,905 B2* | 11/2013 | Mitchell | G06T 15/20 345/419 |
| 8,630,458 B2 | 1/2014 | Oster et al. | |
| 9,274,597 B1* | 3/2016 | Karakotsios | G06F 3/0346 |
| 2002/0190947 A1* | 12/2002 | Feinstein | G06F 1/1626 345/158 |
| 2005/0059488 A1* | 3/2005 | Larsen | A63F 13/10 463/36 |
| 2006/0061551 A1* | 3/2006 | Fateh | G06F 1/1626 345/158 |
| 2009/0179914 A1* | 7/2009 | Dahlke | G06F 1/1626 345/619 |
| 2009/0325607 A1* | 12/2009 | Conway | G06F 1/1624 455/456.3 |
| 2010/0064259 A1 | 3/2010 | Alexanderovitc et al. | |
| 2010/0079371 A1 | 4/2010 | Kawakami et al. | |
| 2010/0079449 A1* | 4/2010 | McCarthy | G06T 15/20 345/419 |
| 2010/0080464 A1* | 4/2010 | Sawai | G06F 3/012 382/190 |
| 2010/0144436 A1 | 6/2010 | Marks et al. | |
| 2011/0102637 A1 | 5/2011 | Lasseson | |
| 2011/0115883 A1 | 5/2011 | Kellerman et al. | |
| 2011/0216060 A1 | 9/2011 | Weising et al. | |
| 2011/0248987 A1 | 10/2011 | Mitchell | |
| 2012/0038627 A1* | 2/2012 | Sung | G06T 7/0042 345/419 |
| 2013/0091462 A1 | 4/2013 | Gray et al. | |
| 2013/0191787 A1 | 7/2013 | Armstrong et al. | |
| 2013/0197681 A1 | 8/2013 | Alberth et al. | |

OTHER PUBLICATIONS

"Non Final Office Action Issued in U.S. Appl. No. 13/159,010", dated Sep. 13, 2016, 20 Pages.
Bleser, et al., "Advance Tracking Through Efficient Image Processing and Visual-inertial Sensor Fusion", In Journal of Computers and Graphics, vol. 33, Issue 1, Feb. 2009, pp. 59-72.
"Non-Final Office Action Issued in U.S. Appl. No. 13/159,010", dated Jul. 30, 2015, 19 Pages.
Chiusano, Andrew Tsutomu, U.S. Office Action, U.S. Appl. No. 13/159,010, dated Dec. 17, 2014, pp. 1-18.
Agarwala et al., Photographing long scenes with multi-viewpoint panoramas, ACM Transactions on Graphics, Jul. 2006, pp. 853-861, vol. 25, No. 3.
Carnegie, et al., A preliminary evaluation of head and facial feature tracking for input on mobile devices, Proc. of the 11th Int'l Conf. on Human-Computer Interaction with Mobile Devices and Services, Sep. 15-18, 2009, pp. 1-2.
Casiez, et al., Rubberedge: Reducing clutching by combining position and rate control with elastic feedback, Proc. of the 20th annual ACM Symposium on User Interface Software and Technology, UIST, Oct. 7-10, 2007, pp. 129-138.
Eriksson, et al., Movement-based interaction in camera spaces: A conceptual framework, Personal and Ubiquitous Computing, Dec. 2007, pp. 621-632, vol. 11, No. 8.
Hannuksela, et al., Face tracking for spatially aware mobile user interfaces, Proc. of the 3rd Int'l Conf. on Image and Signal Processing, ICISP 2008, Jul. 1-3, 2008, pp. 405-412, vol. 5099.
Hansen, et al., Use your head: Exploring face tracking for mobile interaction, Conference on Human Factors in Computing Systems, Extended Abstracts, CHI '06, Apr. 2006, pp. 845-850.
Hinckley, Ken, Input technologies and techniques, The human-computer interaction handbook, 2008, pp. 1-52.
Hinckley, et al., Quantitative Analysis of Scrolling Techniques, Proc. CHI 2002 Conf. on Human Factors in Computing Systems, Minneapolis, MN, Apr. 2002, pp. 65-72.
Hong, et al., Interactive panorama video viewer with head tracking algorithms, 3rd Int'l Conf. on Human-Centric Computing (HumanCom), Aug. 2010, pp. 1-4.
Hua, et al., PEYE: Toward a visual motion based perceptual interface for mobile devices, Proc. of the 2007 IEEE International Conf. on Human-Computer Interaction, Human-Computer Interaction, Oct. 20, 2007, pp. 39-48, vol. 4796, Rio de Janeiro, Brazil.
Igarashi, et al., Speed-dependent automatic zooming for browsing large documents, Proc. of the 13th Annual Symposium on User Interface Software and Technology, Nov. 2000, pp. 139-148, vol. 2.
Ishak, et al., Content-aware scrolling, Proc. of the 19th Annual ACM Symposium on User Interface Software and Technology, Oct. 2006, pp. 155-158.
Kopf, et al., Street slide: Browsing street level imagery, ACM Transactions on Graphics (TOG)—Proceedings of ACM, SIGGRAPH, Jul. 2010, pp. 96:1-96:8, vol. 29, No. 4.
Kumar, et al., Gaze-enhanced scrolling techniques, Proc. of the 20th Annual ACM Symposium on User Interface Software and Technology, Oct. 7-10, 2007, pp. 213-216.
Rohs, M., Real-World Interaction with Camera Phones, Ubiquitous Computing Systems, Lecture Notes in Computer Science, Jan. 2005, pp. 74-89, vol. 3598.
Smith, et al., The radial scroll tool: Scrolling support for stylus- or touch-based document navigation, Proceedings of the 17th Annual ACM Symposium on User Interface Software and Technology, UIST 2004, Oct. 24-27, 2004, pp. 53-56, Santa Fe, NM, USA.
Tsang, M., et al., Boom chameleon: Simultaneous capture of 3D viewpoint, voice and gesture annotations on a spatially-aware display, ACM Trans. Graph., Jul. 2003, p. 698, vol. 22, No. 3.
Viola, et al., Robust real-time face detection, Int'l J. of Comp. Vision, May 2004, pp. 137-154, vol. 57, No. 2.
You, S., et al., Fusion of vision and gyro tracking for robust augmented reality registration, Proc. of the Virtual Reality 2001 Conference, VR 2001, Mar. 2001, pp. 71-78.
Zheng, et al., Parallax Photography: Creating 3D Cinematic Effects from Stills, Proc. of Graphics Interface, Jun. 24, 2009, pp. 111-118.
"Final Rejection Issued in U.S. Appl. No. 13/159,010", dated Apr. 21, 2017, 22 Pages.
"Non-Final Office Action Issued in U.S. Appl. No. 13/159,010", dated Nov. 1, 2017, 24 Pages.

* cited by examiner

NATURAL USER INTERFACES FOR MOBILE IMAGE VIEWING

This is a division of prior application Ser. No. 13/159,010 entitled "Natural User Interface for Mobile Image Viewing" and filed Jun. 13, 2011.

BACKGROUND

Most viewing of photographs now takes place on an electronic display rather than in print form. Yet, almost all interfaces for viewing photos on an electronic display still try to mimic a static piece of paper by "pasting the photo on the back of the glass", in other words, simply scaling the image to fit the display. This approach ignores the inherent flexibility of displays while also living with the constraints of limited pixel resolution.

In addition, the resolution and types of imagery available continues to expand beyond traditional flat images, e.g., high resolution, multi-perspective, and panoramic imagery. Paradoxically, as the size and dimensionality of available imagery has increased, the typical viewing size has decreased as an increasingly significant fraction of photo viewing takes place on a mobile device with limited screen size and resolution. As a result, the mismatch between imagery and display has become even more obvious. While there are obvious limitations due to screen size on mobile devices, one significant benefit is that they are outfitted with numerous sensors including accelerometers, gyros, and cameras. The sensors, are currently ignored in the image viewing process.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The mobile image viewing technique described herein provides a hands-free interface for viewing large imagery (e.g., 360° panoramas, parallax image sequences, and long multi-perspective panoramas) on mobile devices. The technique controls a display on a mobile device, such as, for example, a mobile phone, by movement of the mobile device. The technique uses sensors to track the mobile device's orientation and position, and front facing camera to track the user's viewing distance and viewing angle. The technique adjusts the view of a rendered image on the mobile device's display according to the tracked data.

More particularly, in one embodiment, the technique employs a sensor fusion methodology that combines viewer tracking using a front facing camera with gyroscope data from the mobile device to produce a robust signal that defines the viewer's 3D position relative to the display. For example, viewer tracking can be achieved by face tracking, color-blob/skin tracking, tracking feature points of the face and other types of ego-motion and optical flow tracking. The gyroscopic data provides both low latency feedback and allows extrapolation of the face position beyond the field-of-view of the front facing camera. The technique employs a hybrid position and rate control that uses the viewer's 3D position to drive viewing and exploration of very large image spaces on the mobile device.

DESCRIPTION OF THE DRAWINGS

The specific features, aspects, and advantages of the disclosure will become better understood with regard to the following description, appended claims, and accompanying drawings where:

DETAILED DESCRIPTION

In the following description of the mobile image viewing technique, reference is made to the accompanying drawings, which form a part thereof, and which show by way of illustration examples by which the mobile image viewing technique described herein may be practiced. It is to be understood that other embodiments may be utilized and structural changes may be made without departing from the scope of the claimed subject matter.

1.0 Mobile Image Viewing Technique

The following sections provide an overview of the mobile image viewing technique, exemplary processes and an exemplary architecture for practicing the technique, as well as details of the mathematical computations employed in some embodiments of the technique.

1.1 Overview of the Technique

The mobile image viewing technique described herein allows a user to perform image viewing on mobile devices, leveraging the many sensors on typical mobile devices, such as, for example, cell phones or smart phones. In particular, in one embodiment, the technique uses low latency gyros on a mobile device to sense changes in direction of the device as well as the front-facing camera to detect and track the position of a user/viewer relative to a display on the mobile device, albeit with higher noise and latency. Fusion of these two sensor streams provides the functionality to create compelling interfaces to view a range of imagery. The technique provides for natural user interfaces for viewing many forms of complex imagery ranging from multiple images stitched to create a single viewpoint 360° panorama, multi-viewpoint image sets depicting parallax in a scene, and street side interfaces integrating both multi-perspective panoramas and single viewpoint 360° panoramas.

One aspect of large format and/or very wide angle imagery is that there is a natural tension between a desire for direct positional control, i.e., a direct mapping of sensor output to position in the image, versus rate control, mapping sensor position to velocity of motion across an image. In one embodiment, the technique employs a hybrid rate/position control through a single relationship between sensors and output. Some technical contributions of the technique thus include the sensor fusion between the gyro and viewer tracking from front facing camera, as well as novel functional relationships between this sensing and control of image viewing across numerous modalities.

The following sections provide exemplary processes for practicing the technique, an exemplary architecture for practicing the technique and details of various embodiments of the technique. Details for those processes, and the exemplary architecture are described in Section 2.

1.2 Exemplary Processes for Practicing the Technique

Figure 1:
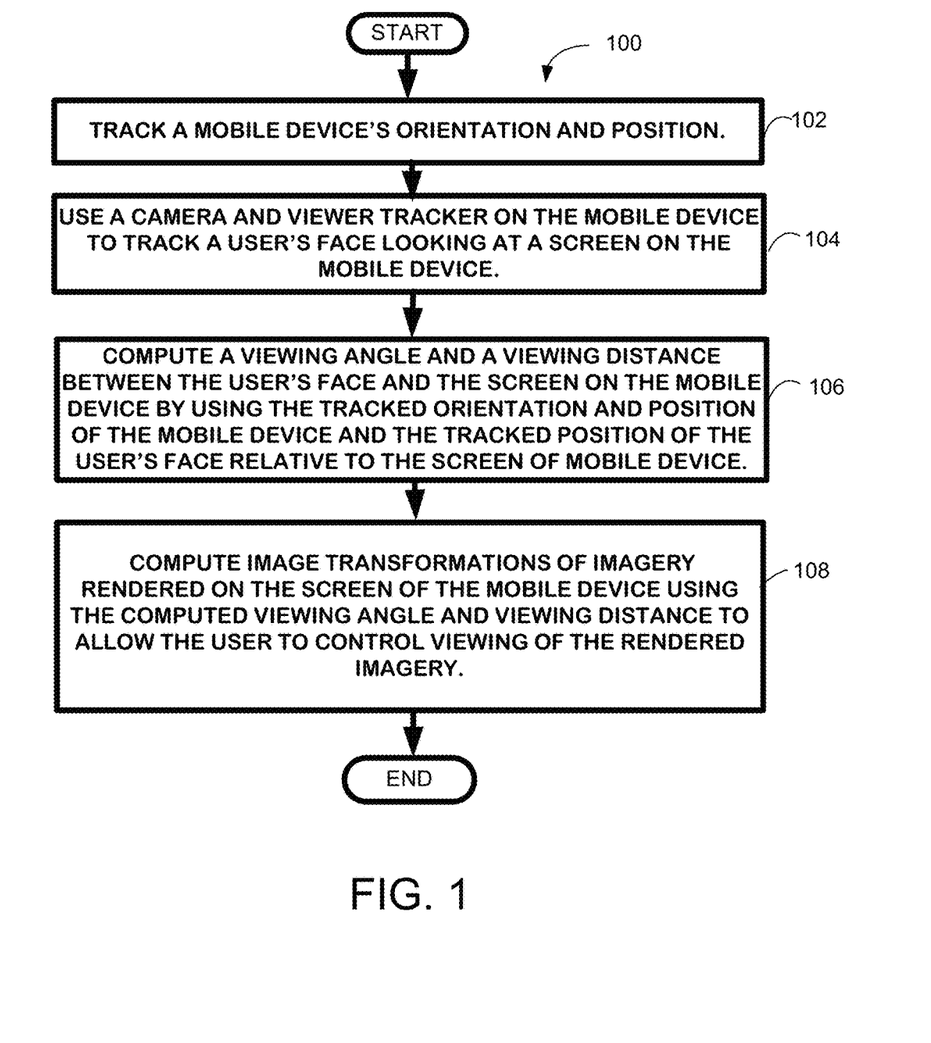
FIG. 1 depicts a flow diagram of an exemplary process for practicing one embodiment of the mobile image viewing technique described herein.

FIG. 1 provides an exemplary process for practicing one embodiment of the mobile image viewing technique. As shown if FIG. 1, block 102, a mobile device's (for example, a mobile phone's) orientation and position are tracked using instrumentation on the device. For example, this mobile device could be a smart phone, Personal Data Assistant (PDA), or other cellular phone with a screen for viewing imagery. Tracking could be, for example, using a gyroscope on the mobile device, a digital compass, an accelerometer, or some other type of instrumentation that can determine orientation and position of the mobile device. A camera and viewer tracker on the mobile device is also simultaneously used to track a user's face looking at a screen on the mobile device, as shown in block 104. For example, the camera could be a front facing camera facing the user/viewer, disposed on the same side of the mobile device as the screen of the mobile device. The viewer tracker could be a face tracker, color-blob/skin tracker, tracker for tracking feature points of the face and other types of ego-motion and optical flow tracker.

A viewing angle and a viewing distance between the user and the screen on the mobile device are computed by using the tracked orientation and position of the mobile device, and the tracked position of the user's face relative to screen of the mobile device, as shown in block 106. The details of computing this viewing angle and viewing distance are provided in Section 3.

Image transformations of imagery to be rendered on the screen of the mobile device are then computed using the computed viewing angle and viewing distance to allow the user to control viewing of the rendered imagery, as shown in block 108. For example, the imagery can include any type of images including single viewpoint panoramas, multi-viewpoint image sets depicting parallax in a scene, multi-perspective panoramas or a combination of these. The user can change the view of the imagery by merely moving the mobile device relative to his or her face.

Figure 2:
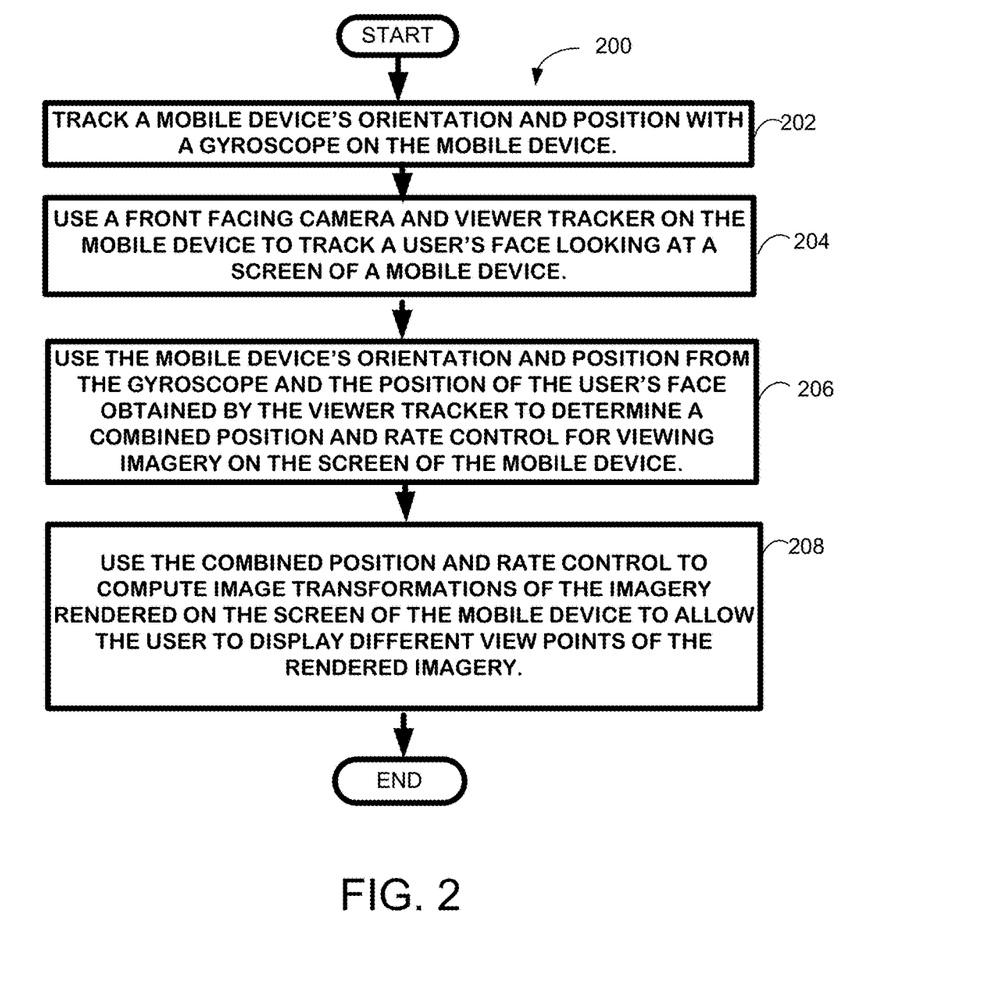
FIG. 2 depicts another flow diagram of another exemplary process for practicing the mobile image viewing technique described herein.

FIG. 2 provides another exemplary process for practicing another embodiment of the mobile image viewing technique. As shown if FIG. 2, block 202, a mobile device's (for example, a mobile phone's) orientation and position is tracked using a gyroscope (although other similar instrumentation could be used). A camera and viewer tracker on the mobile device is also used to track a user's face looking at a screen on the mobile device, as shown in block 204.

The mobile device's orientation and position from the gyroscope and the position of the user's face obtained by the viewer tracker is used to determine a combined position and rate control for viewing imagery on the screen of the mobile device, as shown in block 206. The details of the computation for determining this combined position and rate control are provided in Section 3.

Image transformations of imagery to be rendered on the screen of the mobile device are then computed using the computed combined position and rate control to allow the user to display different points of the rendered imagery, as shown in block 208. In general, the combined position and rate control values are mapped to coordinates in the imagery in order to determine which portion of the imagery to render. When the user moves the mobile device relative to his face the imagery on the device will change based on the distance and the angle the user holds the device.

1.3 Exemplary Architecture

Figure 3:
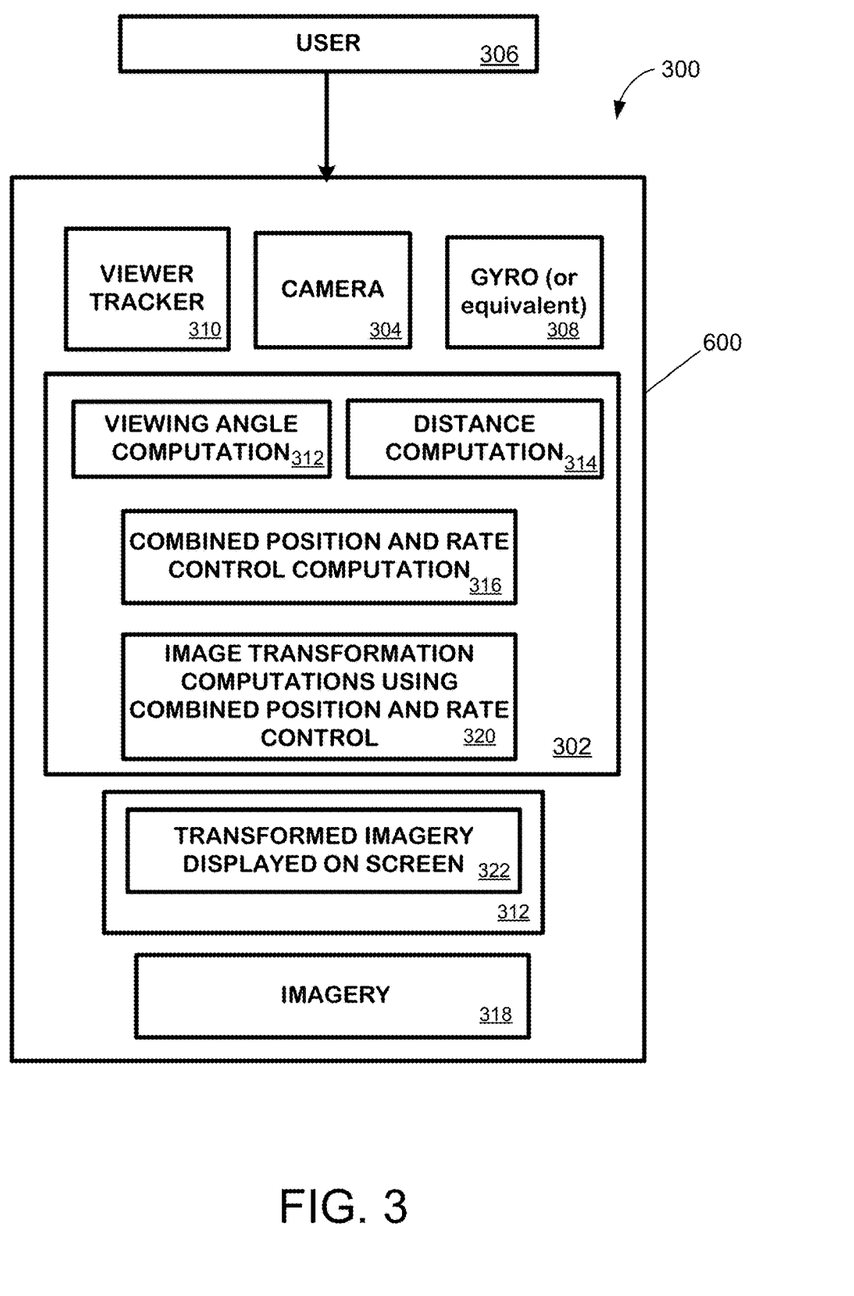
FIG. 3 is an exemplary architecture for practicing one exemplary embodiment of the mobile image viewing technique described herein.

FIG. 3 shows an exemplary architecture 300 for practicing one embodiment of the mobile image viewing technique. As shown if FIG. 3, a mobile imagery computing module 302 is located on a computing device 600, which will be described in greater detail with respect to FIG. 6. This computing device 600 is preferably mobile, such as, for example a mobile phone or smart phone. The mobile computing device 600 includes a camera 304 that can be used to capture the face of a user 306 of the mobile computing device 600. The mobile computing device 600 includes instrumentation such as, for example, a gyroscope 308 that is used to track the mobile computing device's orientation and position. It should be noted, however that other instrumentation capable of determining the mobile devices orientation and position could equally well be used.

The mobile computing device 600 includes a viewer tracker 310 (e.g., a face tracker, optical flow on the camera, point tracker) that is used to track a user's face, looking at a screen 312 on the mobile device, which is captured by the camera 304. The mobile device's tracked orientation and position, and the position of the user's face obtained by the viewer tracker are used to determine a viewing angle in a viewing angle computation module 312 from the mobile computing device 600 to the user 306. In addition, the distance between the mobile computing device and the user are determined in a distance computation module 314. A combined position and rate control for viewing imagery 318 on the screen 312 of the mobile device in a combined position and rate control computation module 316. The output of the combined position and rate control module 316 is used to compute image transformations of imagery to be rendered in an image transformation module 320. The computed image transformations are used to create transformed imagery 322 to be rendered on the screen 312 of the mobile device 600. Using the transformed imagery 322 the user can display different views of the rendered imagery on the screen simply by moving the camera relative to his or her face.

2.0 Exemplary Computations for Embodiments of the Technique

Exemplary processes and an exemplary architecture having been described, the following sections provide details and exemplary calculations for implementing various embodiments of the technique.

2.1 Mapping Sensors to Image Transformations

Despite the lack of many traditional affordances found in a desktop setting (large display, keyboard, mouse, etc.), mobile devices offer a wide variety of sensors (touch, gyroscopes, accelerometers, compass, and cameras) that can help overcome the lack of traditional navigation controls and provide a richer and more natural interface to image viewing. The mobile image viewing technique described herein has been used with various applications that cover a variety of image (scene) viewing scenarios in which the imagery covers either a large field of view, a wide strip multi-perspective panorama, multi-views, or a combination of these. In particular, interfaces for 360° panoramas, multi-view strips exhibiting parallax, and Microsoft® Corporation's Bing™ for iOS StreetSide™ interface that combines very long multi-perspective strip panoramas with single view 360° views. A common aspect of all of these is that the imagery requires exploration to view the full breadth of the data. Details of these exemplary applications are described in Section 3.

The most obvious way to explore imagery that cannot fit in the display is to use touch sensing to mimic a traditional interface. Users have become accustomed to sliding a finger to pan and performing a two fingered pinch for zooming. These affordances have four main drawbacks, however. First, a user's fingers and hand obscure a significant portion of the display. Second, it becomes difficult to disambiguate touches designed for purposes other than navigation, for example, a touch designed to select a link embedded with the imagery. Third, using the touch screen generally requires two hands. Finally, combined motions require sequential gestures, e.g., a "pan and zoom" action requires first a swipe and then a pinch. The mobile image viewing technique described herein instead uses more natural interfaces involving one-handed motion of the device itself for image navigation.

2.2 Hybrid Gyro Plus Viewer Tracking

In the real world, a person moves his or her gaze relative to a scene, or moves an object relative to their gaze to fully explore a scene (or object). In both cases, their head is moving relative to the scene. If one considers an image as a representation of a scene on a device, tracking the head relative to the device as an affordance for navigation seems like a natural fit.

Viewer tracking, such as, for example, face tracking alone can, in theory, provide a complete 3D input affordance, (x,y) position based on face location, and (z) depth based on face size. However, viewer tracking alone exhibits a few robustness problems. Viewer tracking, such as face tracking, is costly and thus incurs some latency. In addition, the vision algorithms for tracking face position and size are inherently noisy as small changes in face shape and illumination can produce unexpected signals. This can be overcome somewhat through filtering albeit at the price of more latency. Finally, viewer tracking is lost beyond an offset angle beyond the field of view of the front facing camera (it has been experimentally found that this limit is about ±15 degrees). Nonetheless, viewer tracking is unique in its ability to deliver a 3D signal that is directly relevant to image viewing applications.

Gyroscopes provide a more robust and lower latency alternative for the 2D (x,y) angular position. For relative orientation, the gyros provide a superior signal, however they do drift considerably. It is common to see 5 degree drifts during a 360° rotation over 15 seconds. In addition, gyros alone cannot disambiguate between the cases shown in FIG. 4 Case B and FIG. 4 Case C. In the first case, the user 402 has rotated the device 404. In the second case, the user 402 has rotated themselves carrying that same rotation to the device 404. To achieve both robustness and liveliness and reduced ambiguity, the technique creates a sensor fusion that is a hybrid of the gyro plus viewer tracking using the front facing camera.

In one embodiment of the technique, it was decided not to use accelerometers for positions tracking based on empirical experience that has shown that aside from the direction of gravity and fairly sudden moves, the noise from the accelerometers overwhelms subtle motions. However, it should be noted that accelerometers, compasses and other tracking devices could feasibly be used to track the mobile device.

2.2.1 Viewer Tracker

In one embodiment of the technique, a face is first located in the front facing camera via a face finder. Various conventional face finders can be used for this purpose. In one embodiment, the technique finds the user's face using a conventional face finder and returns a rectangle for the size and location of the face. A face template is recorded from this rectangle along with the position and size. This template is then matched at varying (x, y) positions and scales around the current (position, scale) at each subsequent frame. The (position, scale) with the highest correlation to the original template in the new frame is considered the current location of the face. In one embodiment, the technique searches over a rectangle 3×the size of the previous face in x and y and over 3 scales between ±5% of the previous scale. If the face is lost, the slower full-frame face finder is re-run until the face is found. Given the field of view of the front facing camera, position is trivially transformed to horizontal and vertical angular offsets, $\theta_x^{F_1}$ and $\theta_y^{F_1}$. From here on, only the more important horizontal offset, $\theta_x^{F_1}$ will be referred to, and the x subscript will be dropped. As previously mentioned, however, other methods of tracking a viewer can be used.

2.2.2 Horizontal Angle

Figure 5:
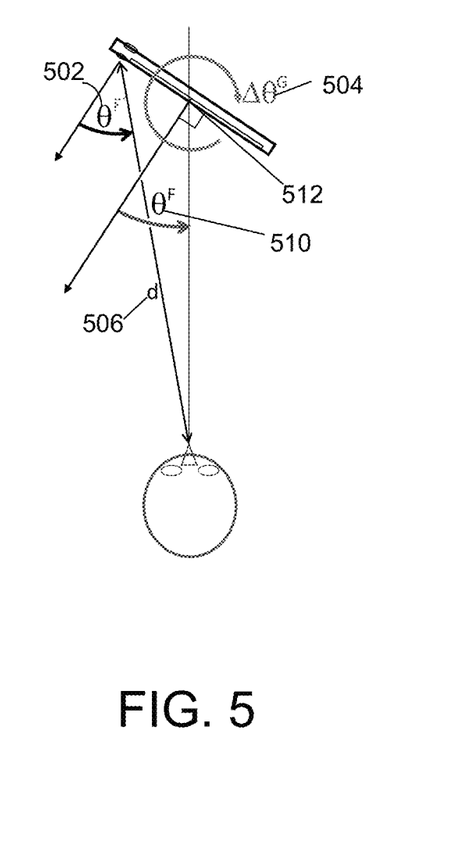
FIG. 5 depicts the face offset angle and distance that is computed from a face tracked in a camera situated to the side of the display of a mobile device.

Referring to FIG. 5, there are two direct signals the technique tracks, $\theta^{F_1}$, 502, the angular offset of the face from the normal to the display (from the front-facing camera), and $\Delta\theta^G$, 504, the change in rotation about the vertical axis tangent to the display (from the gyros). The technique estimates the distance d 506 from the camera 508 from face width. Given the fixed offset of the camera 508 from the center of the display 512 and $\Delta\theta^G$, 504, the technique derives $\theta^F$, 510, the face's angular offset from the display center. It is thus possible to compute the value, $\Theta$, which is mapped to the position and rate control for the user interface.

$$\Theta_t = \alpha \cdot \Theta_{t-1} + (1-\alpha) \cdot (\theta_t^G + \theta_t^D) \quad (1)$$

Figure 4:
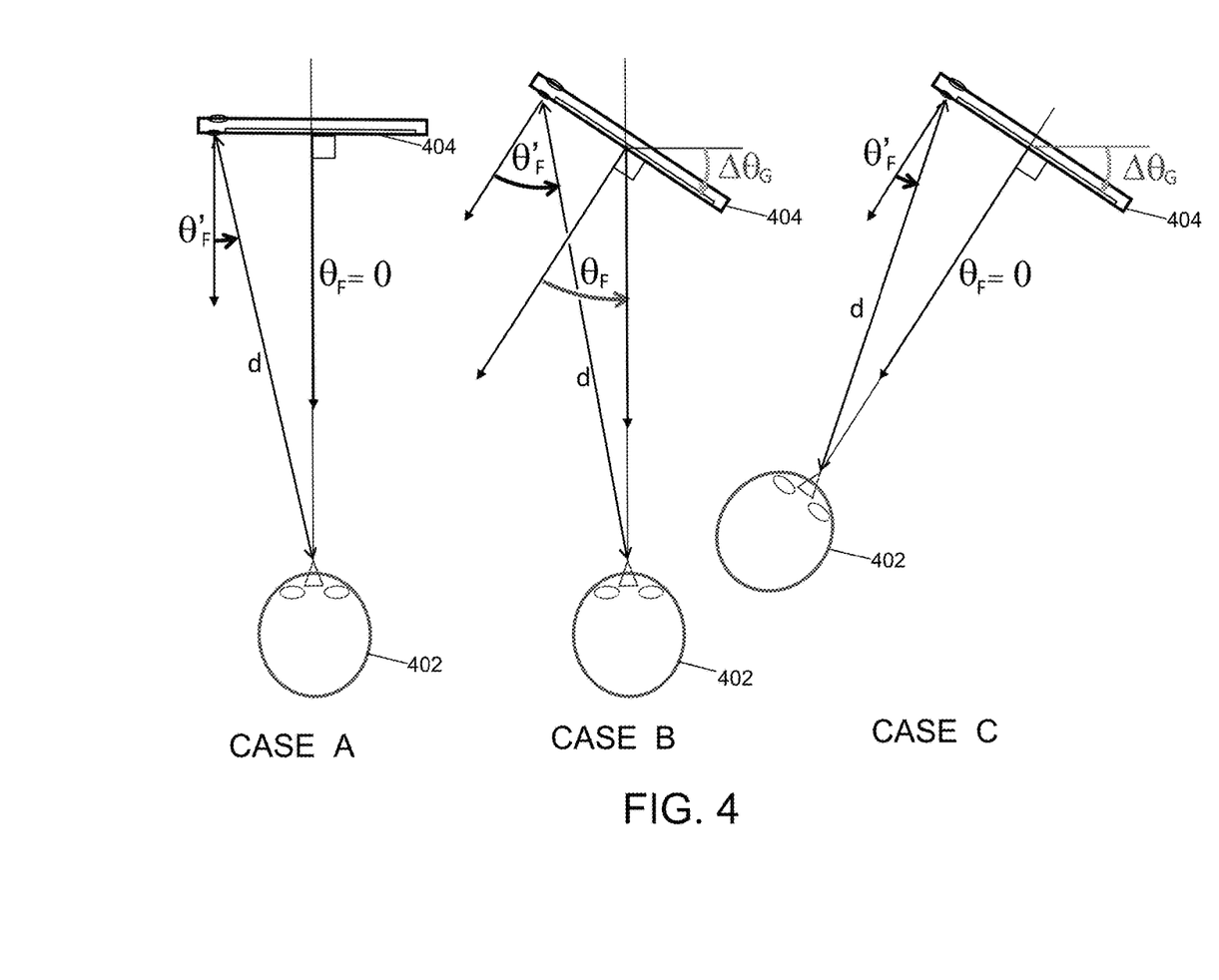
FIG. 4 shows that a gyroscope alone cannot distinguish between situations in Case B and Case C. The drift signal, $\theta^D$, disambiguates these and brings the control in line with $\theta^F$.

$\Theta_t$ represents the value at time t that the technique will map to its control functions. The variable α serves to provide a small amount of hysteresis to smooth this signal. It was found that a value of 0.1 provides a small smoothing without adding noticeable lag. $\theta_t^G$ is the time integrated gyro signal, i.e., the total rotation of the device including any potential drift:

$$\theta_t^G = \theta_{t-1}^G + \Delta\theta_t^G \quad (2)$$

where $\Delta\theta_t^G$ represents the direct readings from the gyro. $\theta_t^D$ represents a smoothed signal of the difference between the face position, $\theta^F$ and the integrated gyro angle, $\theta^G$. This quantity encompasses any drift incurred by the gyro as well as any rotation of the user himself (see FIG. 4 Case C). Since the viewer tracker runs more slowly than the gyro readings (in one embodiment, 1 to 10 HZ for the viewer tracker and 50 Hz for the gyro), the technique records both the face position and gyro values each time a face position is received. $\theta^D$ is thus defined by $$\theta_t^D = \beta \cdot \theta_{t-1}^D + (1-\beta) \cdot (\theta_*^F - \theta_*^G) \quad (3)$$

where "*" represents the time of the most recent face track, and β serves to smooth the face signal and add hysteresis. In one embodiment, the technique uses a much higher value of β=0.9 in this case. This produces a some lag time which actually adds a side benefit discussed in the context of the control mapping.

To summarize, $\Theta_t$ represents a best guess of the face position relative to the device even when the face is beyond the field of view of the device. Although viewer tracking, such as, for example, face tracking, is inherently slow and noisy, the gyro signal serves as a lively proxy with good accuracy over short time intervals. The viewer tracker is used to continuously correct the gyro input to bring it back in line with where the face is seen from the front-facing camera.

2.2.3 Distance

In one embodiment, the technique uses the face width in the camera's view as as proxy for the face's distance from the device. The technique uses a time smoothed face size for this signal.

$$Z_t = \gamma \cdot Z_{t-1} + (1-\gamma) \cdot (1/\text{FaceSize}) \quad (4)$$

where γ=0.9 to smooth over noisy readings albeit at some cost of latency.

2.3 Hybrid Position and Rate Control

Given the angular offset, $\Theta_t$, one is now left with the mapping between this value and the controls for viewing the imagery. The simplest and most intuitive mapping is a position control, in which the $\Theta_t$ is mapped through some linear function to the position on the imagery (i.e., angle in a panorama, position on a large flat image, or viewing position in a multi-view parallax image set). Position mapping can provide fine control over short distances and is almost always the control of choice for displaying imagery when applicable.

Unfortunately, such a simple mapping has severe limitations for viewing large imagery. The useful domain of $\Theta_t$ is between ±40° since beyond this angle of a typical mobile device/phone display becomes severely foreshortened and unviewable. For 360° panoramas or very long multi-perspective images this range is very limited. The alternatives are to provide clutching or to create a rate control in which $\Theta_t$ is mapped to a velocity across the imagery. Although rate controls provide an infinite range as the integrated position continues to increase over time, they have been shown to lack fine precision positioning as well as suffering from a tendency to overshoot.

2.4 Zoom Control

In panorama and street side applications, $Z_t$ is linearly mapped to zoom level. The technique caps the minimum zoom level at a bit less than arm's length. The street side application has a fixed zoom level at which a mode change takes place between the multi-perspective panoramas and cylindrical panoramas. To avoid rapid mode changes near this transition point, the technique eases in a small offset to the zoom level after the mode switch and then eases out the offset after the mode switches back.

2.5 Mapping Controls to Imagery

Once the values of the controls are obtained they are mapped to the imagery to be rendered on the screen. For example, the output of the position and velocity control can be mapped to: the viewing angle in a 360 panorama or viewpoint selection in a multi-point panorama. The zoom control can be used to scale the field of view, i.e., literally zoom in/out on an image or to switch between modes as is described in the previous paragraph.

3.0 Exemplary Applications

The interaction paradigm of the technique described above has been applied to a number of image viewing applications. These include wide angle imagery such as 360° panoramas and parallax photos consisting of a series of side-by-side images. Also, the technique has been applied to very long multi-perspective images and 360° panoramas.

3.1 Panoramas

Wide angle and 360° panoramas have become a popular form of imagery especially as new technologies arrive making their construction easier. Sites, which hosts high resolution panoramas, and the bubbles of street side imagery are two examples.

By interpreting $\Delta X_t$ at each frame time as a change in orientation, and $Z_t$ as the zoom factor, the technique provides an interface to such imagery that does not require two-handed input or standing and physically turning in place.

3.2 Parallax Images

By sliding a camera sideways and capturing a series of images one can create a virtual environment by simply flipping between the images. Automated and less constrained versions for capture and display of parallax photos also exist.

In one embodiment, $\Delta X_t$ at each frame time represents a relative offset of the virtual camera. One embodiment of the technique provides an interface to such imagery that creates a feeling of peering into a virtual environment. In this case, the position control and thus the gyro input dominates. The viewer tracker's role is primarily to counteract gyro drift.

3.3 Street Imagery

A new interface for viewing street side imagery was demonstrated in Microsoft® Corporation's StreetSlide™ application. The original imagery consists of a series of 360° panoramas set at approximately 2 meter intervals along a street. The StreetSlide™ paradigm was subsequently adapted to create long multi-perspective strip panoramas constructed by clipping out and stitching parts of the series of panoramas. The StreetSlide™ application automatically flips between the long strip panoramas and the 360° panoramas depending on zoom level. Other similar applications use traditional finger swipes and pinch operations.

The present mobile image viewing technique was applied as a new user interface on top of the StreetSlide™ application. It could equally well be applied to similar applications. Since there are two modes, the meaning of $\Delta X_t$ switches. In slide mode, $\Delta X_t$ moves the view left and right along the street side. $Z_t$ zooms the strip panorama in and out. At a given zoom level, the mode switches automatically to the corresponding 360° panorama at that location on the street. At this point, the technique revert to the panorama control described above. Zooming out once more returns to the slide mode. Navigation now requires only one hand leaving the other hand free for unambiguous access to other navigation aids and information overlaid on the location imagery.

3.4 Alternate Embodiments

Many other types of media could be viewing using the mobile image viewing technique. For example, the technique can be applied to an interface to mapping applications. Being able to zoom out from a street in San Francisco, pan across the country, and back in to a New York street, for example, would be achievable by simply moving the device away, tilting it "east" and pulling the device back towards the viewer.

4.0 Exemplary Operating Environments

Figure 6:
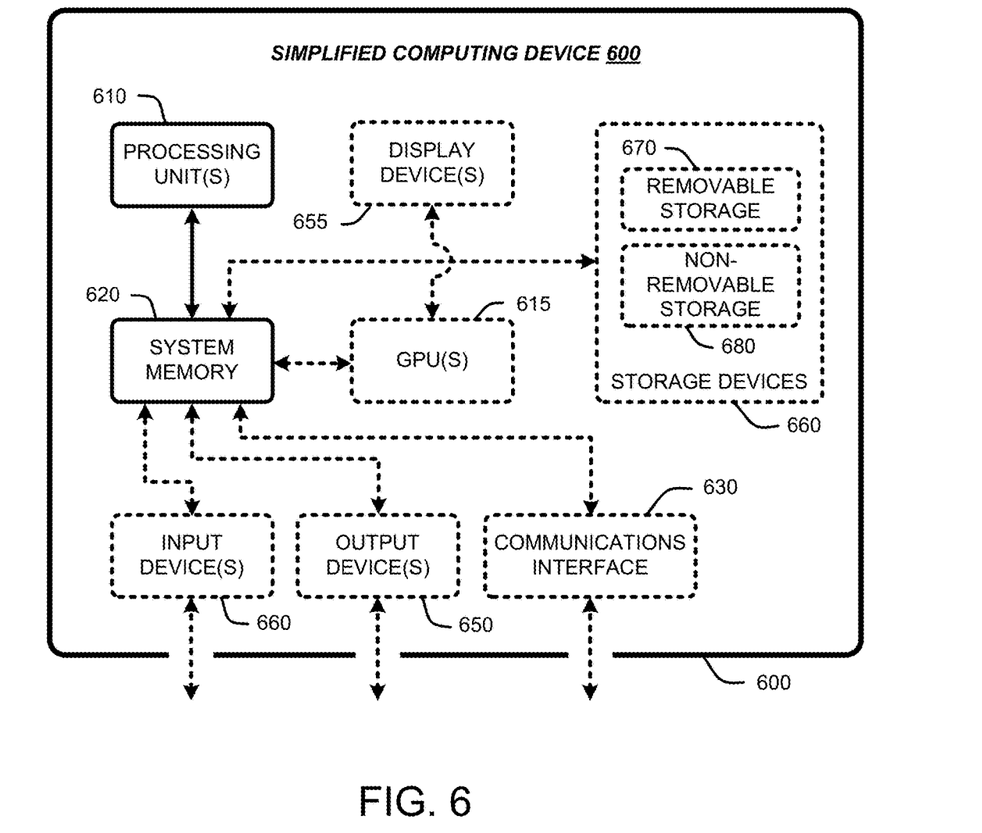
FIG. 6 is a schematic of an exemplary computing environment which can be used to practice the mobile image viewing technique.

The mobile image viewing technique described herein is operational within numerous types of general purpose or special purpose computing system environments or configurations. FIG. 6 illustrates a simplified example of a general-purpose computer system on which various embodiments and elements of the mobile image viewing technique, as described herein, may be implemented. It should be noted that any boxes that are represented by broken or dashed lines in FIG. 6 represent alternate embodiments of the simplified computing device, and that any or all of these alternate embodiments, as described below, may be used in combination with other alternate embodiments that are described throughout this document.

For example, FIG. 6 shows a general system diagram showing a simplified computing device 600. Such computing devices can be typically found in devices having at least some minimum computational capability, including, but not limited to, personal computers, server computers, hand-held computing devices, laptop or mobile computers, communications devices such as cell phones and PDA's, multiprocessor systems, microprocessor-based systems, set top boxes, programmable consumer electronics, network PCs, minicomputers, mainframe computers, audio or video media players, etc.

To allow a device to implement the mobile image viewing technique, the device should have a sufficient computational capability and system memory to enable basic computational operations. In particular, as illustrated by FIG. 6, the computational capability is generally illustrated by one or more processing unit(s) 610, and may also include one or more GPUs 615, either or both in communication with system memory 620. Note that that the processing unit(s) 610 of the general computing device of may be specialized microprocessors, such as a DSP, a VLIW, or other microcontroller, or can be conventional CPUs having one or more processing cores, including specialized GPU-based cores in a multi-core CPU.

In addition, the simplified computing device of FIG. 6 may also include other components, such as, for example, a communications interface 630. The simplified computing device of FIG. 6 may also include one or more conventional computer input devices 640 (e.g., pointing devices, keyboards, audio input devices, video input devices, haptic input devices, devices for receiving wired or wireless data transmissions, etc.). The simplified computing device of FIG. 6 may also include other optional components, such as, for example, one or more conventional computer output devices 650 (e.g., display device(s) 655, audio output devices, video output devices, devices for transmitting wired or wireless data transmissions, etc.). Note that typical communications interfaces 630, input devices 640, output devices 650, and storage devices 660 for general-purpose computers are well known to those skilled in the art, and will not be described in detail herein.

The simplified computing device of FIG. 6 may also include a variety of computer readable media. Computer readable media can be any available media that can be accessed by computer 600 via storage devices 660 and includes both volatile and nonvolatile media that is either removable 670 and/or non-removable 480, for storage of information such as computer-readable or computer-executable instructions, data structures, program modules, or other data. By way of example, and not limitation, computer readable media may comprise computer storage media and communication media. Computer storage media includes, but is not limited to, computer or machine readable media or storage devices such as DVD's, CD's, floppy disks, tape drives, hard drives, optical drives, solid state memory devices, RAM, ROM, EEPROM, flash memory or other memory technology, magnetic cassettes, magnetic tapes, magnetic disk storage, or other magnetic storage devices, or any other device which can be used to store the desired information and which can be accessed by one or more computing devices.

Storage of information such as computer-readable or computer-executable instructions, data structures, program modules, etc., can also be accomplished by using any of a variety of the aforementioned communication media to encode one or more modulated data signals or carrier waves, or other transport mechanisms or communications protocols, and includes any wired or wireless information delivery mechanism. Note that the terms "modulated data signal" or "carrier wave" generally refer a signal that has one or more of its characteristics set or changed in such a manner as to encode information in the signal. For example, communication media includes wired media such as a wired network or direct-wired connection carrying one or more modulated data signals, and wireless media such as acoustic, RF, infrared, laser, and other wireless media for transmitting and/or receiving one or more modulated data signals or carrier waves. Combinations of the any of the above should also be included within the scope of communication media.

Further, software, programs, and/or computer program products embodying the some or all of the various embodiments of the mobile image viewing technique described herein, or portions thereof, may be stored, received, transmitted, or read from any desired combination of computer or machine readable media or storage devices and communication media in the form of computer executable instructions or other data structures.

Finally, the mobile image viewing technique described herein may be further described in the general context of computer-executable instructions, such as program modules, being executed by a computing device. Generally, program modules include routines, programs, objects, components, data structures, etc., that perform particular tasks or implement particular abstract data types. The embodiments described herein may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Still further, the aforementioned instructions may be implemented, in part or in whole, as hardware logic circuits, which may or may not include a processor.

It should also be noted that any or all of the aforementioned alternate embodiments described herein may be used in any combination desired to form additional hybrid embodiments. Although the subject matter has been described in language specific to structural features and/or methodological acts, it is to be understood that the subject matter defined in the appended claims is not necessarily limited to the specific features or acts described above. The specific features and acts described above are disclosed as example forms of implementing the claims.

What is claimed is:

1. A computer-implemented process for viewing imagery on a mobile device, comprising:
   tracking a mobile device's orientation and position with a gyroscope;
   using a front-facing camera and viewer tracker on the mobile device to track a position of a user's face looking at a screen on the mobile device;
   correcting drift of the gyroscope based on the tracked position of the user's face to provide a drift-corrected orientation and position of the mobile device;
   computing image transformations for an image, a portion of which is displayed in two dimensions on the screen of the mobile device at any one time, using the tracked mobile device's drift-corrected orientation and position and the tracked position of the user's face;
   affecting a dynamic change of the perspective of the displayed portion of the image, comprising changing the portion of the image displayed on the screen of the mobile device based on a change in the mobile device's orientation or position or both relative to the tracked position user's face, wherein the perspective of the image displayed can be changed even when the user's face is outside of the front-facing camera's field of view.

2. The computer-implemented process of claim 1, further comprising:
   computing a viewing angle and a viewing distance between the user's face and the screen on the mobile device by using the tracked orientation and position of the mobile device, and the tracked position of the user's face relative to screen of the mobile device in order to compute the image transformations, wherein the image transformations are mapped to a control for a user interface that controls the transformations of imagery displayed on the screen of the mobile device.

3. The computer-implemented process of claim 2, wherein affecting a dynamic change of the perspective of the displayed portion of the image further comprises zooming in or out of the portion of the image displayed on the screen whenever the viewing distance of the mobile device relative to the user's face changes.

4. The computer-implemented process of claim 1, wherein affecting a dynamic change of the perspective of the displayed portion of the image further comprises panning around the portion of the image displayed on the screen whenever the position of the mobile device changes laterally in relation to the tracked position of the user's face.

5. The computer-implemented process of claim 1, wherein affecting a dynamic change of the perspective of the displayed portion of the image further comprises changing the portion of the image displayed on the screen when the mobile device is tilted.

6. The computer-implemented process of claim 1, wherein the perspective of the displayed portion of the image is determined from an angular offset of the user's face from the normal to the screen determined by the camera, and wherein a change in rotation of the displayed portion of the image about an axis tangent to the screen is determined based on the drift-corrected orientation and position of the mobile device.

7. The computer-implemented process of claim 1 wherein the image comprises location imagery that is displayed by a mapping application.

8. The computer-implemented process of claim 7 wherein information is overlaid on the location imagery.

9. The computer-implemented process of claim 1 wherein the image comprises a multi-perspective panorama.

10. A computer-implemented process for viewing imagery on a mobile device, comprising:
    tracking a mobile device's orientation and position using a gyroscope on the mobile device;
    using a front-facing camera and viewer tracker on the mobile device to track a position of a user's face looking at a screen on the mobile device;
    correcting drift of the gyroscope based on the tracked position of the user's face to provide a drift-corrected orientation and position of the mobile device;
    using the mobile device's drift-corrected orientation and position from the gyroscope and the position of the user's face from the front-facing camera to determine a combined position and rate control for viewing imagery in three dimensions on the screen of the mobile device;
    using the combined position and rate control to compute image transformations of the imagery rendered on the screen of the mobile device to allow the dynamic display of different viewpoints in three dimensions of the rendered imagery; and
    dynamically displaying the image transformations of the imagery on the screen of the mobile device.

11. The computer-implemented process of claim 10, wherein the imagery is a 360 degree panorama and wherein dynamically displaying the image transformations of the image includes panning to the left and to the right in the rendered imagery based on a change of a viewing angle between the user's face and the screen of the mobile device, and zooming into or out of the imagery based on a change in a distance between the user's face and the screen of the mobile device.

12. The computer-implemented process of claim 10, wherein the imagery is a set of parallax images and wherein the combined position and rate control is used to determine a relative offset of a virtual camera.

13. The computer-implemented process of claim 10, wherein the imagery comprises a series of 360 degree panoramas of the same scene taken at fixed intervals, and a set of long perspective strip panoramas created by clipping out and stitching parts of the series of 360 degree panoramas.

14. The computer-implemented process of claim 13, wherein dynamically displaying the image transformations of the image include panning left and right in a 360 degree panorama of the series based on a change of a viewing angle between the user's face and the screen of the mobile device and zooming into or out of a different 360 degree panorama of the series based on a change of a viewing distance between the user's face and the screen of the mobile device.

15. A system for viewing imagery, comprising:
a computing device;
a computer program comprising program modules executable by the computing device, wherein the computing device is directed by the program modules of the computer program to,
track a mobile device's orientation and position with a gyroscope;
use a camera and viewer tracker to track a position of a face of a user viewing imagery rendered on the screen of the mobile device,
correct drift of the gyroscope based on the tracked position of the face of the user to provide a drift-corrected orientation and position of the mobile device;
compute image transformations of the imagery rendered on the screen of the mobile device that allow for dynamic display of different viewpoints of the rendered imagery in both depth and position based on the drift-corrected orientation and position of the mobile device even when the face of the user is outside of the field of view of the camera by moving the mobile device relative to the user's face.

16. The system of claim 15 wherein a viewpoint of the imagery rendered on the screen of the mobile device changes based on a change of a viewing angle of the mobile device relative to the user's face.

17. The system of claim 15, wherein an angular offset of the face from the normal to the screen obtained from the camera and a change in rotation about an axis tangent to the screen determined based on the drift-corrected orientation and position of the mobile device are used to map to the control for a user interface used to display the image transformations.

18. The system of claim 15, wherein the imagery rendered on the screen changes based on tilting of the mobile device.

* * * * *